Figure 1:
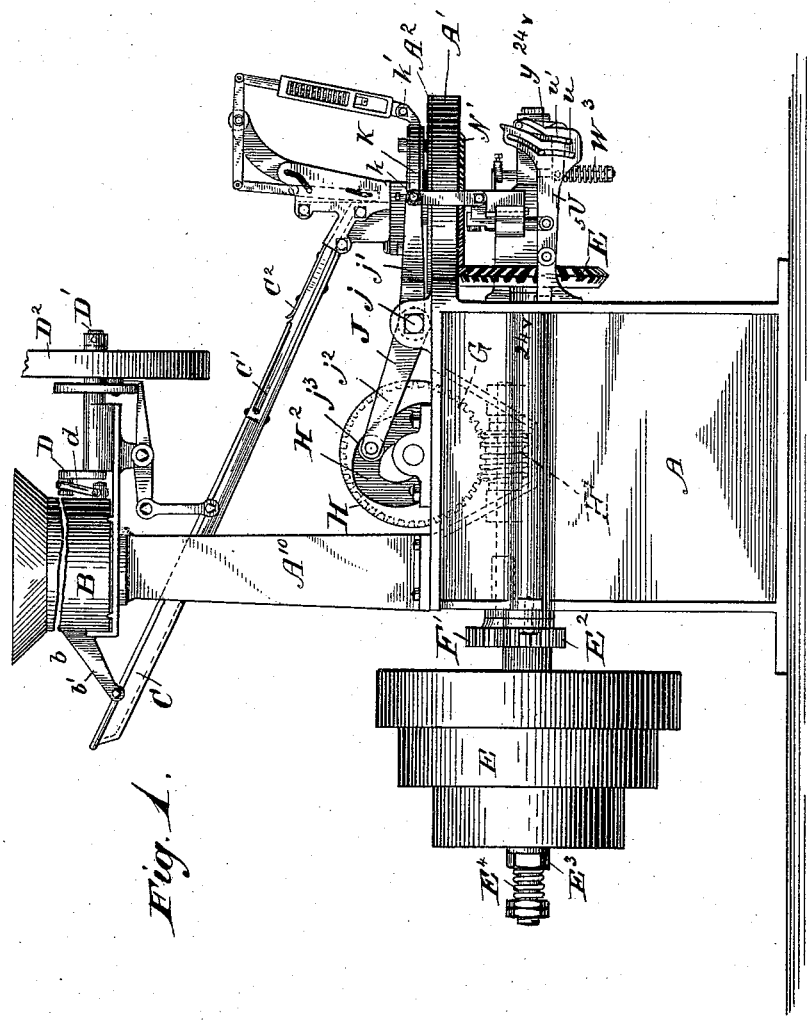

(No Model.)　　　　　　　　　　　　　　　　　　　8 Sheets—Sheet 1.
F. S. COOK, Dec'd.
J. W. Cook, Administrator.
NUT TAPPING MACHINE.

No. 532,535.　　　　　　　　　　　Patented Jan. 15, 1895.

Witnesses.
Arthur Johnson
Florence King.

Inventor.
Jerome W. Cook, administrator
of the Estate of
Frank S. Cook
Deceased.
By Walter H. Chamberlin
Atty.

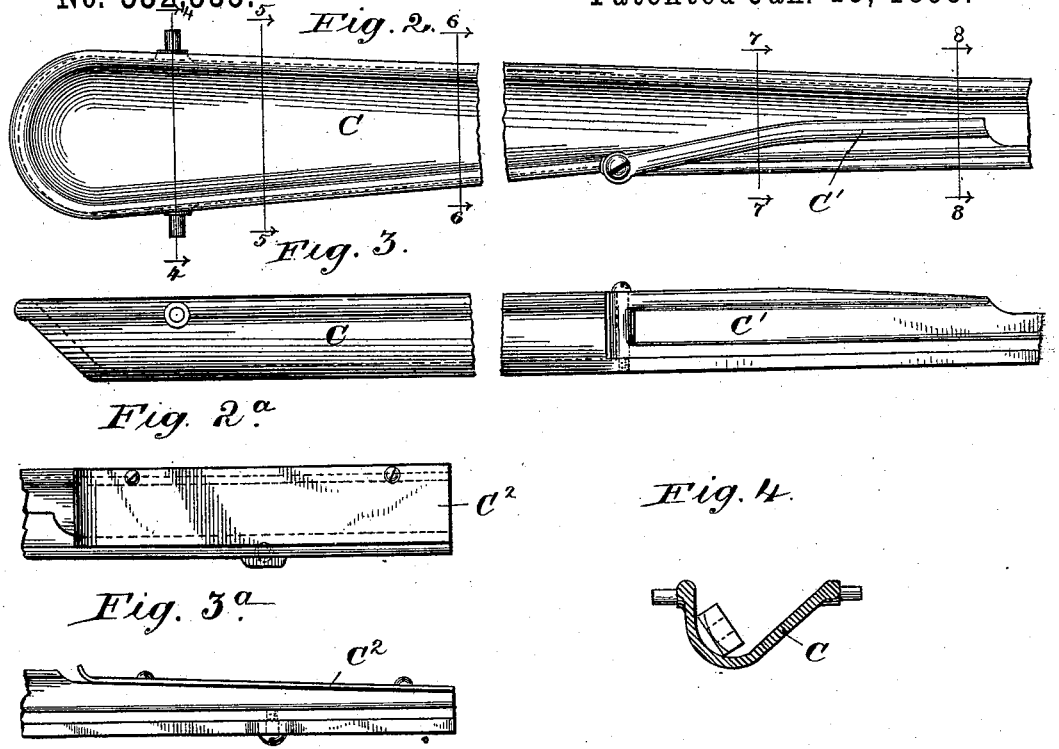

(No Model.) 8 Sheets—Sheet 3.
F. S. COOK, Dec'd.
J. W. Cook, Administrator.
NUT TAPPING MACHINE.
No. 532,535. Patented Jan. 15, 1895.
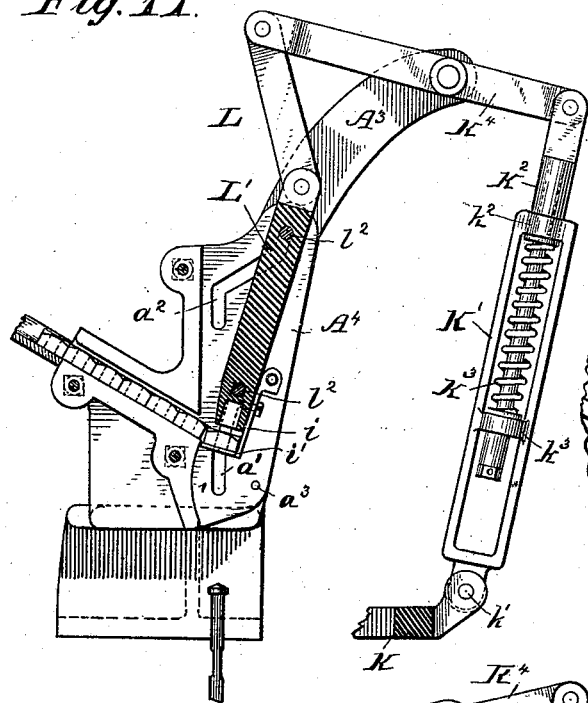
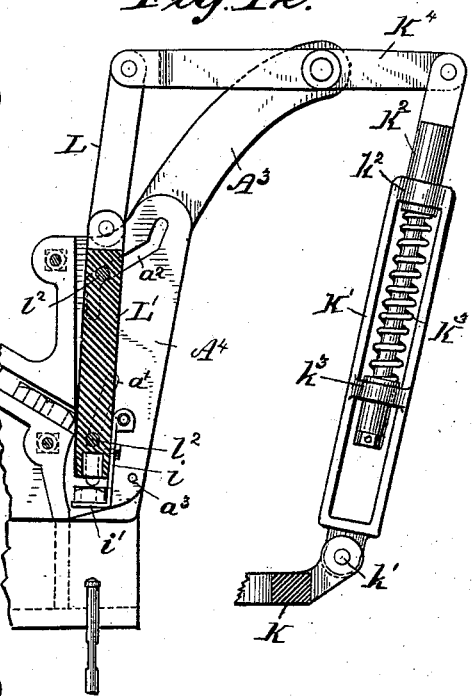
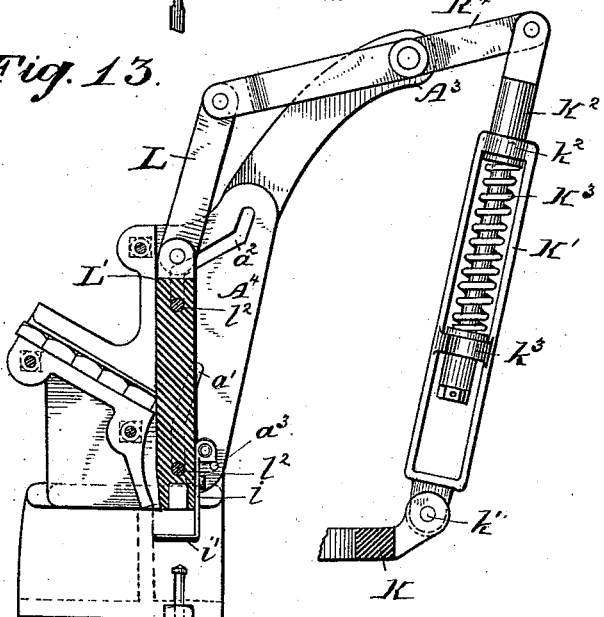
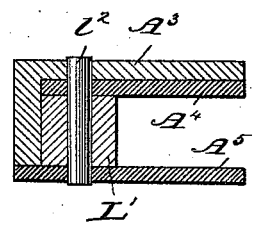
Witnesses
Arthur Johnson
Florence King
Inventor
Jerome N. Cook
Administrator of the Estate of
Frank S. Cook
deceased
By Walter H. Chamberlin
Atty.

(No Model.) 8 Sheets—Sheet 4.
F. S. COOK, Dec'd.
J. W. COOK, Administrator.
NUT TAPPING MACHINE.
No. 532,535. Patented Jan. 15, 1895.
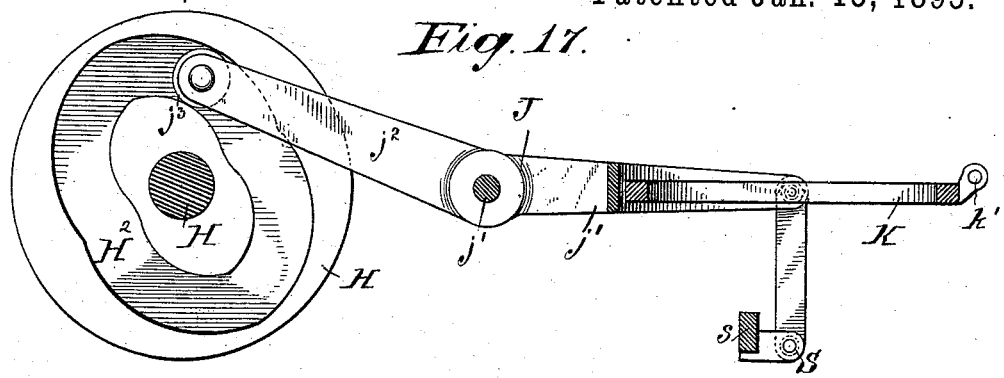
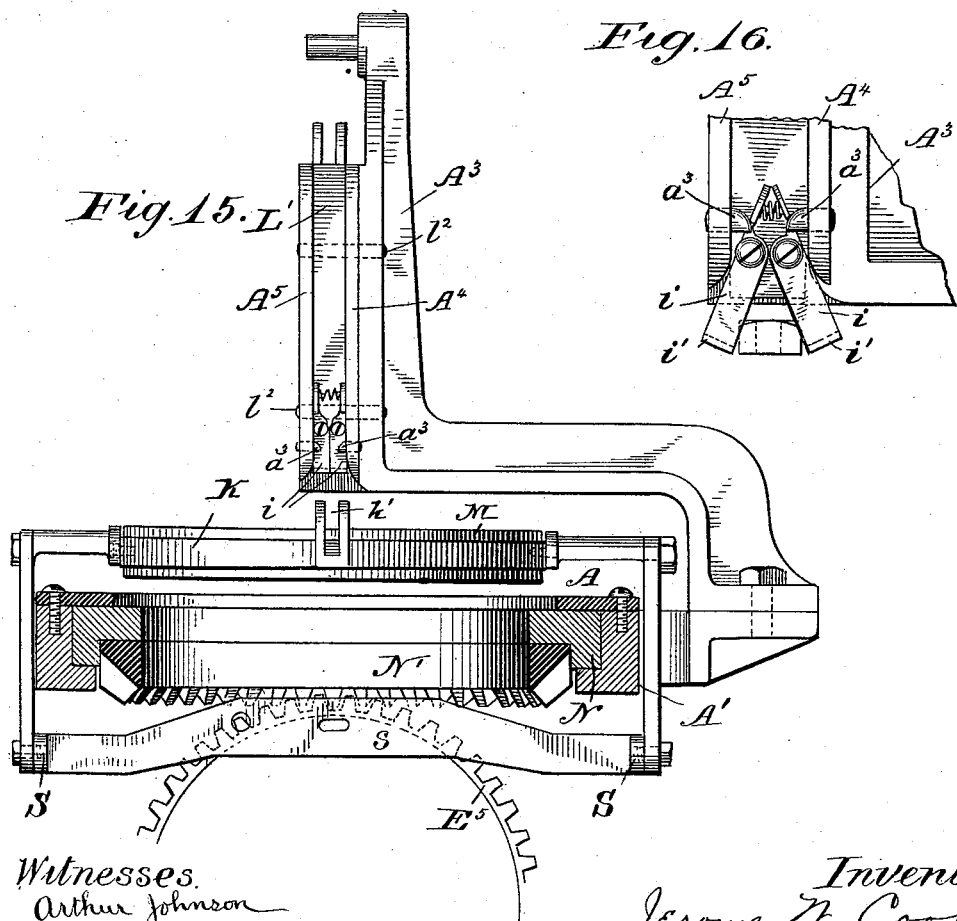
Witnesses.
Arthur Johnson
Florence King
Inventor.
Jerome W. Cook
Administrator of the
Estate of Frank S. Cook
deceased
By Walter H. Chamberlin
Atty (No Model.) 8 Sheets—Sheet 5.
F. S. COOK, Dec'd.
J. W. Cook, Administrator.
NUT TAPPING MACHINE.
No. 532,535. Patented Jan. 15, 1895.
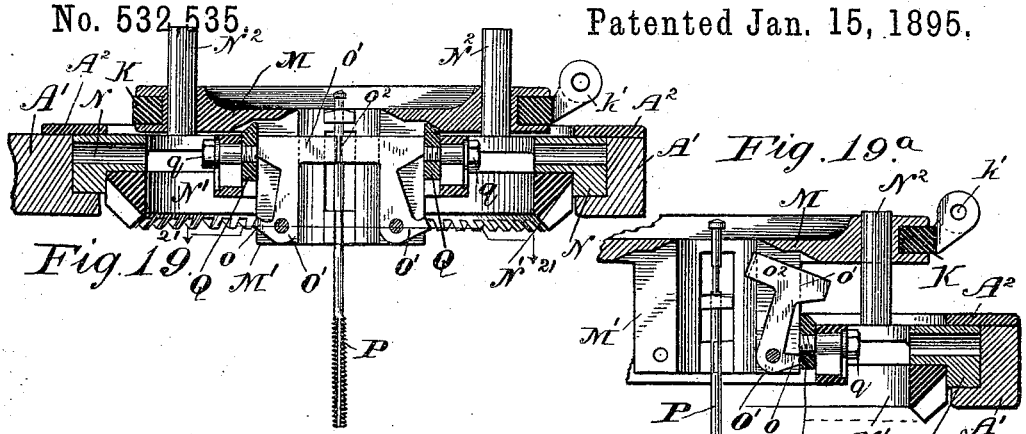
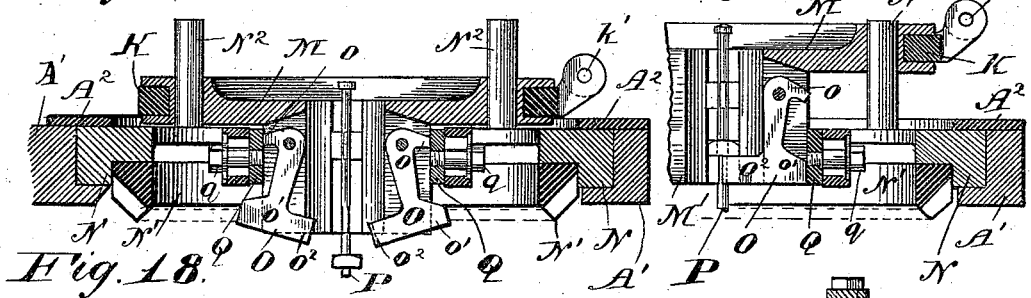
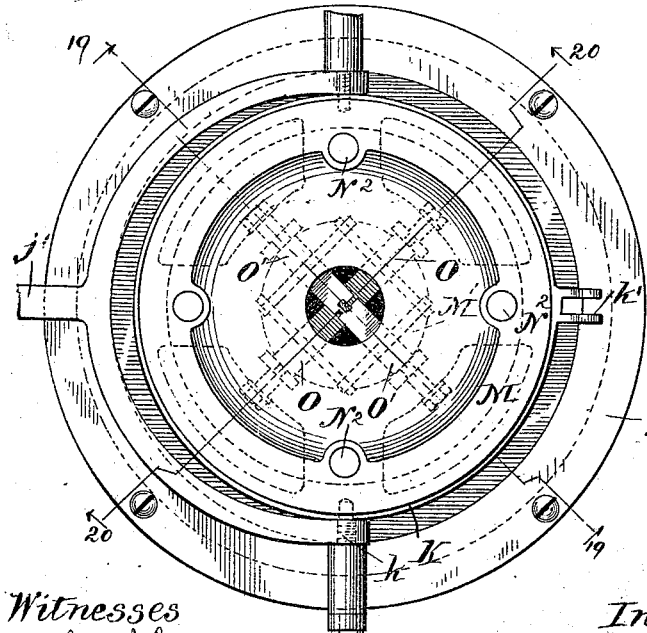
Witnesses
Arthur Johnson
Florence King
Inventor
Jerome N. Cook
Administrator of the Estate of
Frank S. Cook, deceased.
By Walter H. Chamberlin Atty.

(No Model.) 8 Sheets—Sheet 6.

F. S. COOK, Dec'd.
J. W. Cook, Administrator.
NUT TAPPING MACHINE.

No. 532,535. Patented Jan. 15, 1895.

Witnesses
Arthur Johnson
Florence King

Inventor
Jerome W. Cook
Administrator of the Estate of
Frank S. Cook
deceased
By Walter H. Chamberlin
Atty.

(No Model.)  F. S. COOK, Dec'd.  8 Sheets—Sheet 7.
J. W. Cook, Administrator.
NUT TAPPING MACHINE.
No. 532,535.  Patented Jan. 15, 1895.
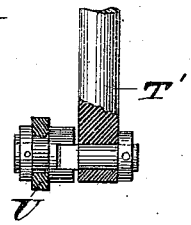
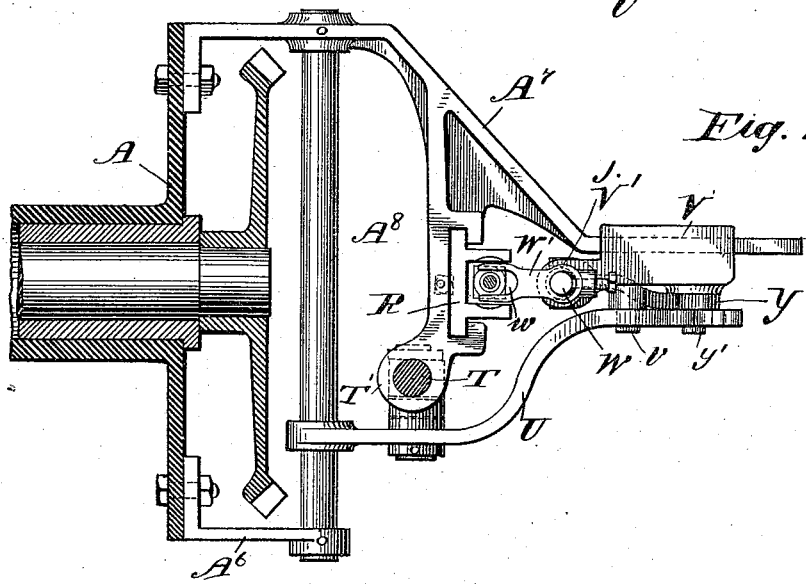
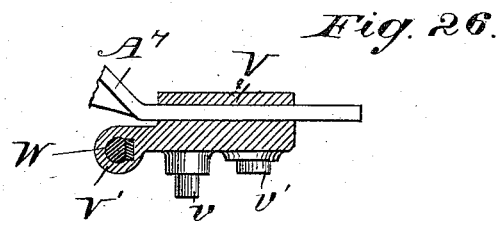
Witnesses.  Inventor.
Arthur Johnson.  Jerome W. Cook
Florence King.  Administrator of the Estate of
  Frank S. Cook
    deceased
  By Walter H. Chamberlin
    Atty.

(No Model.)　　　　　　　　　　　F. S. COOK, Dec'd.　　　　　　8 Sheets—Sheet 8.
J. W. Cook, Administrator.
NUT TAPPING MACHINE.

No. 532,535.　　　　　　　　　　　　　Patented Jan. 15, 1895.

Witnesses.
Arthur Johnson
Florence King

Inventor:
Jerome W. Cook, Administrator of the Estate of Frank S. Cook, deceased
By Walter H. Chamberlin
atty.

THE NORRIS PETERS CO., PHOTO-LITHO., WASHINGTON, D. C.

UNITED STATES PATENT OFFICE.

JEROME W. COOK, OF SPRINGFIELD, OHIO, ADMINISTRATOR OF FRANK S. COOK, DECEASED, ASSIGNOR TO THE CAPITOL MANUFACTURING COMPANY, OF CHICAGO, ILLINOIS.

NUT-TAPPING MACHINE.

SPECIFICATION forming part of Letters Patent No. 532,535, dated January 15, 1895.

Application filed April 4, 1893. Serial No. 468,975. (No model.)

*To all whom it may concern:*

Be it known that FRANK S. COOK, deceased, (JEROME W. COOK, a citizen of the United States, residing at Springfield, county of Clark, State of Ohio, administrator of the estate of FRANK S. COOK, deceased,) did invent a certain new and useful Improvement in Nut-Tapping Machines; and the following is declared to be a full, clear, and exact description of the invention, such as will enable others skilled in the art to which it pertains to make and use the same, reference being had to the accompanying drawings, which form a part of this specification.

This invention belongs to that class of nut tapping machines in which a tap is held in a vertical position and is continuously revolved in one direction only, the nuts passing onto the tap at the upper end, and dropping from the lower end thereof properly tapped.

Perhaps the most essential feature of this invention is the fact that the position of the tap is reversed, that is instead of the blank passing from the nut box or holder directly onto the cutting end of the tap and then dropping down over the shank of the tap, it first passes onto the shank past the holding devices or jaws and then down onto the cutting portion where it is threaded.

In this invention also the mechanism for engaging and holding the shank of the tap is arranged to reciprocate up and down as hereinafter explained.

The invention consists in a combination of devices and appliances hereinafter described and claimed.

Figure 22:
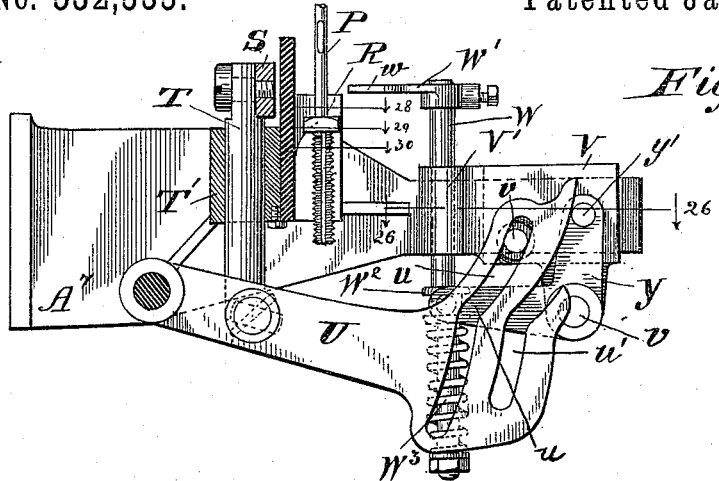
Figure 23:
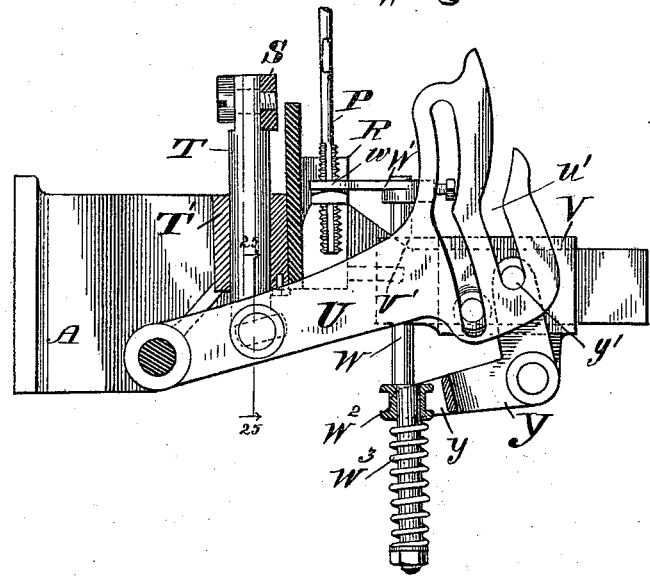
Figure 27:
Figure 28:
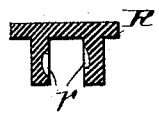
Figure 29:
Figure 30:
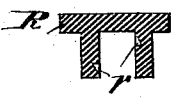
Figure 31:
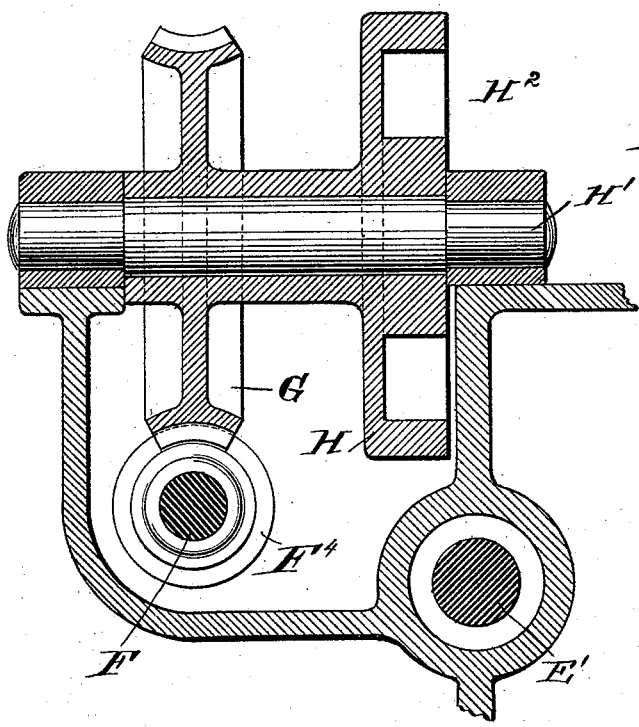
Figure 32:
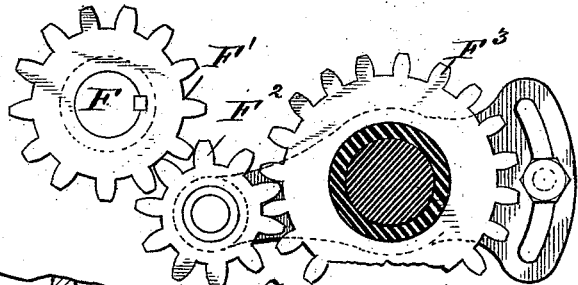
Figure 33:
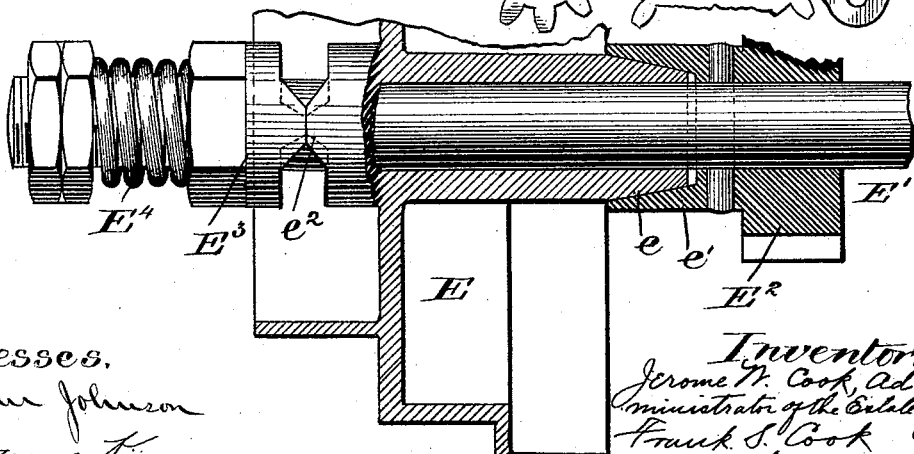

In the drawings: Figure 1. is a side elevation of the machine. Fig. 2. is a plan view of a portion of the conduit which conveys the blanks from the hopper to the tap. Fig. 2$^a$. is a plan view of the lower end of the conduit. Fig. 3. is a side elevation of the portion shown in Fig. 2. Fig. 3$^a$. is a side elevation of the portion shown in Fig. 2$^a$. Figs. 4, 5, 6, 7, 8, 9 and 10 are cross sections of the trough at various points. Figs. 11, 12, and 13 are side elevations with parts in sections of the plunger mechanism employed to force the nut onto the tap. Fig. 14. is a cross section. Fig. 15. is a side elevation with parts in section of the tap holding chuck; Fig. 16, a detail view of the lower end of the vertical conduit through which the blank passes. Fig. 17. is a detail view of the cam which operates the plunger mechanism. Fig. 18. is a plan view of the tap holding chuck; Fig. 19, a cross section on the line 19—19 of Fig. 18. Fig. 20. is a cross section on the line 20—20 of Fig. 18. Fig. 19$^a$. is a detail view of Fig. 19, showing the compartive position of the parts when the chuck holding mechanism is up. Fig. 20$^a$. is a detail view of Fig. 20, also showing the comparative position of the parts when the chuck holding mechanism is up. Fig. 21. is a cross section on the line 21—21 of Fig. 19. Figs. 22 and 23 are details of the cam mechanism employed to force the nut onto the threaded portion of the tap. Fig. 24. is a cross section on the line 24—24 of Fig. 1. Figs. 25 and 26. are detail views. Fig. 27. is a view of the end of the conduit through which the nut passes while being tapped. Figs. 28, 29 and 30 are cross sections on the lines indicated in Fig. 22. Figs. 31, 32 and 33 are sections and elevations of the driving mechanism.

In carrying out the invention A represents the frame of the machine to which the operative parts are engaged, and extending therefrom is the standard A$^{10}$, to the upper end of which the hopper B is engaged. This hopper is rotatable, provided with an opening as at $b$, and a conduit $b'$ leads to the upper end of the conduit C, the latter leading down to the mechanism adjacent to the tap.

The hopper may be agitated to let the blanks out into the conduit in any suitable way, as for instance by the crank D driven by the shaft D', and band-wheel D$^2$, the crank being pivoted to the hopper by the pitman $d$.

Any suitable clutch mechanism may be employed to connect the conduit C with the shaft D', so that when a predetermined weight of blanks have passed into the conduit, the hopper will cease being agitated until those blanks have passed out of the conduit.

The details of the hopper and its agitating mechanism have been shown in some of the prior applications, and need not be further elaborated on. A novel means for tilting the blanks to the proper position is however, herein shown.

It will be observed in Figs. 4 to 10, Sheet 2, that the conduit is of peculiar shape in cross sections. Pivoted to one side thereof is an arm C', the lower end of which is adjustably engaged to the bottom of the conduit as at $c$, Fig. 10. The blank enters the upper end, slides down until it strikes this arm C' (Fig. 7) where it is forced over so that it will be in proper position to be forced down onto the tap. A plate $C^2$ covers the lower end of the conduit. By means of the slot $c$, Fig. 10, the lower end may be adjusted to fit different sized nuts.

The driving gear will now be described.

E is the driving pulley engaged to the shaft E' by suitable clutch mechanism, such for instance as that shown in Fig. 33. The end of the hub of the pulley E is beveled as at $e$ to fit against the correspondingly beveled end $e'$ of the gear $E^2$ which is keyed to the shaft E'. The opposite end of the hub of the pulley has one or more beveled knobs, or projections $e^2$ on the end, and a sliding collar $E^3$ on the shaft, and also has its face which comes in contact with the end of the hub of the pulley correspondingly shaped.

A spring $E^4$ tends to keep the collar $E^3$ tightly against the end $e$ of the pulley and thus force the beveled end of the latter against the beveled end of the gear $E^2$, but should the mechanism become clogged in any way to prevent the revolution of the shaft E', the spring $E^4$ would give sufficiently to permit the pulley E to revolve without revolving the shaft.

F is an auxiliary shaft extending substantially parallel with the shaft E' and geared to the latter by the gears F', $F^2$ and $F^3$ (Fig. 32). On the shaft F is a worm gear $F^4$ which engages the gear G.

H is a wheel keyed to the same shaft H' as the gear G. The wheel H has in its face the cam groove $H^2$.

J is a lever pivoted at $j$ to the frame of the machine. The arms of the lever are arranged at a slight angle to each other, to form an obtuse angle, so that when the arm $j'$ is horizontal the arm $j^2$ projects upward slightly, as shown in Fig. 1. On the end of the arm $j^2$ is a roller $j^3$ which travels in the cam slot $H^2$ of the wheel H. Now as will be seen, when the wheel H is revolved, the end $j^2$ of the lever J will be alternately elevated and depressed. The arm $j'$ is bifurcated at each end, being pivoted to opposite ends of the collar K as at $k$, Figs. 1 and 18. This collar K surrounds and is engaged to the vertically reciprocating block M of the chuck, (Sheet 5).

The construction of the tap holding chuck will now be described. Extending from the frame of the machine, and a part thereof, is a circular flange A', and resting in this flange but free to revolve horizontally is the block N, being held in place by the plate $A^2$, and provided with the beveled gear N'. This gear meshes with the beveled gear $E^5$ on the shaft E' and consequently the block N partakes of the motion of the shaft. Extending upwardly from this block are the pins $N^2$ and working on these pins is the block M. This block M is provided with a downwardly projecting ring, or flange M' which as shown by the dotted lines in Fig. 18 is channeled out, and the two sets of jaws O—O' are pivoted therein, the jaws O being at right angles to the jaws O', and the ends of one set being reversed from that of the other set. Now as will be seen, the block M has a horizontal revolution, because of its connection through the pins $N^2$ with the block N. The block M also has a vertically reciprocating motion because the ring K is engaged to it, and the ring receives the vertically reciprocating motion through the lever J. Thus while the jaws are being constantly revolved by the shaft F', they are being vertically reciprocated by the lever J. As will be seen the shape of the jaws is peculiar. They are pivoted at one end, and from this end is a projection $o$, extending at an angle from the main portion of the jaw. The other end of the jaw has a cross-head $o'$, one end $o^2$ of the latter being shaped to engage and hold a suitably squared portion of the spindle of the tap P. Engaged in the block N by set screws $q$ are the linings or bearings Q. Now as will be seen by reference to Sheet 5, when the block M is lifted, it carries with it the jaws O—O'. This carries the end $o$ of the jaws O' against the linings Q, and because of this projection $o$ bearing against the lining, the jaws are thrown open, as shown in Fig. 19$^a$. This upward movement of the block M has at the same time brought the end $o'$ of the jaw O against the lining or bearing Q and forced the jaws O together so that they will engage the tap and hold it. Thus each time the block M is raised the jaws O are caused to grasp the tap, and each time the block M is lowered, the jaws O are opened, and the jaws O' closed, or caused to engage the tap. Thus by so timing the mechanism and feed, a blank will pass onto the spindle of the shank, when the jaws O' are open, will drop down to the jaws O. The jaws O' will then close and grasp the tap while the blank will drop down onto the threaded portion of the tap.

The feed mechanism whereby the blanks are properly fed onto the tap will now be described. Pivoted to the ring K at $k'$ is a yoke K', and through the end $k^2$ and cross piece $k^3$ of the yoke, extends a rod or shank $K^2$, a spring $K^3$ being interposed between the yoke and rod $K^2$, so that the connection between the two is yielding. Pivoted to the rod $K^2$ is the lever $K^4$, the latter being pivoted to the arm $A^3$ that extends up from the frame of the machine. Pivoted to the lever $K^4$ is what may be termed a jointed plunger composed of two parts L—L'. On the arm $A^3$ are two plates $A^4$—$A^5$ between which the plunger L' works. These plates are provided with peculiarly shaped slots $a^2$—$a'$ and into these slots project pins $l^2$ from the plunger. On the lower end of the plunger are levers $i$, shown in detail in Fig. 16. The lower ends of these levers are turned at right angles to themselves as at $i'$, and form a receiver on to which the blank slides when it leaves the conduit, as shown in Fig. 11. As will be seen when the ring K is elevated it forces up the yoke K', rod K$^2$ and consequently the end of the lever K$^4$ that is pivoted to the rod K$^2$, and thus depresses the opposite end of the lever and the plunger L'. As the plunger descends it is carried to a vertical position by the slots $a^2$—$a'$. When it reaches its lower position, as in Fig. 13, the upper ends of the levers $i$ strike against the beveled pins $a^3$, and the lower ends of the levers are thrown apart, allowing the blank to drop down onto the upper end of the tap. The blank then drops down as before described to the threaded portion of the tap. Engaged to the frame of the machine, and projecting therefrom are the arms A$^6$—A$^7$, Figs. 22, 23 and 24.

Engaged to the arm A$^7$ is a vertical channel R, Sheets 6 and 7. The walls of this channel are of a peculiar shape in cross section, there being on the inner face of each flange $r$ a groove, or recess $r'$ which gradually narrows down until it disappears. The blank as soon as it passes onto the spindle of the tap partakes of the revolution of the latter. When it strikes the channel, no matter in what position it may be, its corners will engage the recess $r'$, and as it is forced down it will gradually be turned so that its sides are parallel with the sides of the channel. Pivoted to the ring K, Fig. 15, is the yoke S, the cross-bar $s$ of which is engaged to a vertically reciprocating rod T working in a suitable bearing or socket T' in the arm A$^7$, Figs. 22 and 23.

Extending between the arms A$^6$—A$^7$ is a lever U which is engaged to the lower end of the rod T by a sliding engagement, such as shown in detail in Fig. 25. Engaged to the outer end of the arm A$^7$ is a sliding block V, provided with two studs $v$—$v'$. The other end of the lever U is provided with a vertical slot $u$ into which the stud $v$ extends. The slot is of such shape that as the outer end at the lever U rises and falls, the block V will be horizontally reciprocated. On the end of this block is a bearing V' in which is the vertically reciprocating rod W, provided on its upper end with the arm, or finger W', having the bifurcated end $w$, as shown in Fig. 24. On this rod W is a collar W$^2$ free to slide up and down on said rod W. Below the collar and bearing on the nut at the lower end of the rod W is a spring W$^3$. Pivoted to the block V is a bell crank lever Y, the end of one arm $y$ being bifurcated to engage the collar W$^2$, while the other end is provided with a pin $y'$ that engages in the slot $u'$ in the end of the lever U.

Now as will be seen the mechanism can be so timed that when the blank drops down onto the threaded portion of the tap and into the channel R, and as the tap and chuck are rising to take another blank onto the other end of the spindle of the tap, the free end of the lever U will be raised. This will cause the block V to travel toward the tap and the arm W' will be forced over so that it will engage the blank. At the same time the pin $y'$ has engaged in the slot $u'$ and the bell crank lever forces the rod W and the arm W' downward, thus causing the blank to engage the threads on the tap and to be properly threaded. When the blank reaches the lower end of the threaded portion, it drops off, and into a suitable receptacle beneath.

The operation briefly is as follows: The blanks are placed in the hopper and from there are fed through the conduit to the tap. This tap is revolved by the chuck and is held alternately by the jaws O—O'. As the blank reaches the tap, the plunger L' carries it down onto the tap and it falls to a point between the jaws O—O'. At this time the tap is held by the jaws O. As the chuck revolves and with it the tap, the block M, shifting its position through the agency of the lever J and cam H$^2$, opens the jaws O and closes the jaws O'. The blank then drops down onto the threaded portion of the tap, being forced down by the arm W', until it is threaded when it drops down to a suitable receptacle beneath.

It will be observed that the entire operation of the machine is automatic, and the blanks are tapped without any cessation of the revolution of the tap.

What is claimed is—

1. In a nut tapping machine the combination with the horizontally revolving chuck provided with means for engaging and holding the tap, of the tap having its shank engaged by said holding device in the chuck, mechanism above the chuck for carrying the blank down and forcing it upon the shank of the tap, and devices below said holding devices for engaging the blank and forcing it onto the threaded portion of the tap, substantially as described.

2. In a nut tapping machine the combination of a continuously revolving tap held in a vertical position by a horizontally revolving chuck, and means for causing said chuck to reciprocate vertically while it is revolving horizontally, substantially as described.

3. In a nut tapping machine the combination of a tap held in a vertical position by a chuck, said chuck provided with two sets of jaws, mechanism for revolving said chuck horizontally and mechanism for causing the chuck to reciprocate vertically, thus causing each set of jaws to alternately engage the shank of the tap, substantially as described.

4. In a nut tapping machine the combination with the tap of a chuck for holding the same, consisting of a block carrying two sets of jaws, said block provided with mechanism for causing it to reciprocate vertically, and an outer shell or block provided with mechanism for causing it to revolve horizontally, said latter block provided with bearings which engage and operate the jaws when the latter are vertically reciprocated, substantially as described.

5. In a nut tapping machine the combination with the tap, of a chuck for revolving the same horizontally and at the same time causing it to reciprocate vertically, consisting of a horizontally revolving block provided with pins or guides on which a vertically reciprocating block is located, said latter provided with pivoted jaws which engage the shank of the tap and are operated by coming to a bearing against bearings on said first named block, substantially as described.

6. The combination of the tap B, with the horizontally revolving block N provided with adjustable bearings Q, pins $N^2$ and block M provided with jaws O—O', substantially as described.

7. The combination with the reciprocating block M of two sets of jaws pivoted therein, said jaws shaped as shown with the projection $o$ at one end, and the projection $o'$ at the other, substantially as described.

8. The combination with the reciprocating block M of two sets of jaws pivoted therein, the position of one set of jaws being reversed from that of the other set, said jaws provided on one end with the projection $o$, and on the other with the projection $o'$, substantially as described.

9. In a nut tapping machine the combination with the tap, of means for conveying the blanks to said tap consisting of a vertically reciprocating plunger provided on its lower end with a pair of levers shaped to receive the blank, and stops on the frame to open the levers and thus cause them to discharge the blank at the lower end of the stroke of the plunger, substantially as described.

10. The combination with a vertically reciprocating chuck carrying the tap, of the lever pivoted to the frame of the machine above the tap, one end of said lever connected with the chuck, while the opposite end is provided with a plunger adapted to carry the blank toward the tap as the latter ascends, substantially as described.

11. The combination with a vertically reciprocating chuck carrying the tap, of a lever pivoted to the frame of the machine above the tap, one end of said lever engaged to the chuck by a yielding connection while the opposite end of the lever is provided with a plunger, the lower end of the latter being provided with means for receiving and conveying one of the blanks to the ascending tap, substantially as described.

12. The combination with the lever $K^4$ having one end engaged to the vertically reciprocating chuck of the jointed plunger provided with a connection with the frame of the machine whereby when said plunger is in its upper position it is held at an angle to a vertical line, but as it descends it assumes a vertical position, substantially as described.

13. The combination with the frame of the machine provided with slots $a'—a^2$, of a vertically reciprocating plunger provided with pins which enter said slots, substantially as described.

14. In a nut tapping machine the combination with a suitable receptacle for the blanks of means for conveying the blanks from said receptacle to the tap consisting of an inclined conduit provided with an adjustable wing or arm forming one side of the conduit, said wing pivoted to the conduit at its upper end and engaged by an adjustable set screw at its lower end, substantially as described.

15. The combination with the conduit C of the wing C' forming one side of said conduit, said wing provided adjacent to its lower end with an overhanging upper edge, substantially as described.

16. The combination with the vertically reciprocating and horizontally revolving tap of an arm or finger for engaging the blank on said tap and forcing it onto the threaded end of the tap, and means for causing said arm or finger to move horizontally to engage the blank, substantially as described.

17. The combination with the horizontally revolving and vertically reciprocating tap of an arm or finger for engaging the blank on the tap, means for causing said arm to move horizontally and means for causing it to move vertically, substantially as described.

18. The combination with the tap of a lever pivoted to the machine and engaged to a vertically reciprocating rod, the free end of said lever provided with the slot $u$, and the block V carrying the arm or finger W', provided with the studs $v$ which enter said slot $u$, substantially as described.

19. The combination of the lever U pivoted to the frame of the machine and engaged to the vertically reciprocating rod T, said lever provided with the slots $u—u'$, the horizontally reciprocating block V carrying the arm or finger W', the bell crank lever Y, and the studs $v—v'$, substantially as described.

20. The combination with the tap carrying the blank, of a channel or guide within which the tap revolves, and through which the blank passes while being tapped, the upper ends of the walls of said channel being provided with inclined recesses, substantially as described.

In testimony whereof I sign this specification in the presence of two witnesses.

JEROME W. COOK,

*Administrator of the estate of Frank S. Cook.*

Witnesses:
ROBERT C. RODGERS,
ROBERT COCHRAN.